UNITED STATES PATENT OFFICE 2,487,698

TOPPING FOR SALADS, DESSERTS, AND SIMILAR PRODUCTS

Helton W. Diamond, Dearborn, Mich.

No Drawing. Application February 21, 1946, Serial No. 649,369

8 Claims. (Cl. 99—144)

My invention relates to a composition of matter which is a food product belonging to the class of materials known as whips or toppings. It relates more particularly to a topping which is a blend or association of substances which are vegetable in origin, and still more particularly, to a vegetable whip or topping in which the fat component is plain refined hydrogenated vegetable oil.

In the prior art, it was known that an association of the food elements fat, protein, and carbohydrates with water and a stabilizer, none of which was animal in origin, could be made chemically and mechanically to produce a substance which would whip or increase in volume more than two hundred fifty percent (250%) by incorporating air during whipping, beating, or similar agitation, if the fat component of the product, or a major portion thereof, were the material known in the bakers' trade as "high-ratio fat" or "high-ratio shortening." The association of the ingredients in the proper proportions to produce a topping or whip was, in the prior art, a matter of conjecture and trial and error, the actual chemical reactions involved and the nature of the process not being fully understood.

An object of the instant invention is the preparation of a vegetable whip or topping whose whipping qualities, such as minimum time of whipping, percent increase in volume, and external appearance and texture are predictable, an advantage to both the manufacturer and the user.

Another object of this invention is to prepare a vegetable topping using plain refined hydrogenated vegetable oil, and without using the specially treated fat known in the bakers' trade as high-ratio fat or high-ratio shortening.

Still another object of the instant invention is to disclose the true nature of the ingredient from which a topping or whip of this type derives its property of incorporating more than one and one-half times its volume of air to form a product which resembles whipped cream, and which is stable, retaining its structure four or more hours at room temperature, that is to say twenty degrees centigrade to thirty degrees centigrade (20–30° C.)

I have discovered that one of the usual several components of so-called high-ratio fat or high-ratio shortening, namely, one or more partial glycerides resulting from the combination of any edible vegetable fat with glycerin is, when incorporated in a vegetable whip or topping of the type described above, responsible for its whipping quality.

These partial glycerides are of two types, the monoglyceride and the diglyceride. The monoglyceride is represented by the formula:

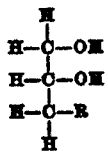

in which R represent a fatty acid residue derived from an edible fat of vegetable origin. The diglyceride is represented by the formula:

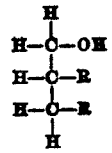

in which R represents a fatty acid residue derived from an edible fat of vegetable origin. Partial glycerides, or synthetic fats, of these types, and the reactions by which they can be prepared, are well known and described in organic chemistry. To illustrate, glycerin and fat can be made to react at two hundred forty degrees centigrade to two hundred fifty degrees centigrade (240–250° C.), with a fraction of one percent of soap as catalyst, and agitation to insure intimate contact of the reactants. The metathetical reaction is usually complete in fifteen minutes to thirty minutes. The molar proportions of glycerin to fat are two-to-one (2:1), one-to-one (1:1), or one-to-two (1:2), respectively, according to whether the monoglyceride, a mixture of the monoglyceride and the diglyceride, or the diglyceride is desired. A typical reaction of this type can be represented thus:

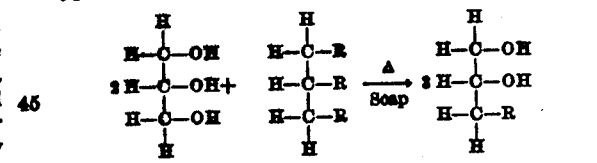

Glycerin—2 moles + Fat—1 mole ⟶ Monoglyceride—3 moles

The partial glyceride resultant can be deflavored for food use by the usual method of blowing steam through it under a vacuum.

A fundamental principle in chemistry is that substances of similar molecular structure are mutually soluble or miscible. The solubilities of alcohol in water, and glycerin in water, are thus explained. A similar principle operates in the behavior of surface active agents, including emulsifiers such as the partial glycerides. Foster D. Snell discusses this principle in "Surface active agents," Industrial and Engineering Chemistry, volume 35, pages 107 to 117 (1943). A surface active agent effective in stabilizing water and fat emulsions has a molecule made up of two parts, one of which is hydrophilic, or water-loving, and the other of which is attracted to the fat phase. The molecules of the surface active agent behave as connecting links, actually orienting themselves in such a way that part of each molecule is in the aqueous phase and part is in the fat phase. There can be little doubt, by deduction, that this is the function performed by the partial glycerides in the vegetable whip, binding the water and the fat in an emulsion so stable that more than its own volume of air can be whipped into it. In molecules of the partial glycerides described above, the fatty acid residues attached to the glyceryl radicals are the same fatty acid residues found in the fat itself. The whipping quality of the topping improves after twenty-four to forty-eight hours, the improvement being due to the gradual orientation of the partial glyceride molecules at the interface.

The material known in the bakers' trade as high-ratio fat or high-ratio shortening contains other ingredients besides the partial glycerides, and when obtained from various and different maufacturers at various and different times, is found to have various and different compositions. As a result of this fact, it was difficult if not impossible in the prior art to prepare consecutive batches of topping of uniform whipping quality, or consecutive batches of topping whose whipping characteristics, such as minimum time of whipping, percent increase in volume, and external appearance and texture were known in advance.

I have discovered that a vegetable topping of predictable whipping qualities can be made by associating eight-tenths percent to one and one-half percent (0.8%–1.5%) of vegetable protein, of which an example is soy bean protein; four percent to eight percent (4.0%–8.0%) of vegetable carbohydrate, of which dextrose and commercial glucose are examples; twenty-five percent to thirty-five percent (25.0%–35.0%) of plain refined vegetable fat, of which an example is hydrogenated soy bean oil; eight-tenths percent to three percent (0.8%–3.0%) of monoglyceride prepared from glycerin and an edible fat of vegetable origin, of which hydrogenated soy bean oil is an example; with fifty-two and one-half percent to sixty-nine and four-tenths percent (52.5%–69.4%) of water, and with or without added neutral and inert edible minerals, salt, color, flavor, or vitamins, at a temperature of forty-five degrees centigrade to seventy-five degrees centigrade (45° C.–75° C.) and pH of six and six-tenths to seven and six-tenths (6.6–7.6) by means of a viscolyzer or homogenizer which disperses the fat particles in the aqueous phase to produce an emulsion resembling cream in appearance. The optimum pressure of homogenization depends upon the type of machine used, but in general, any homogenizer or viscolyzer which distributes or disperses the fat particles in the aqueous phase to produce a stable emulsion is usable and effective.

A typical composition and preparation of a vegetable topping embodying my invention is as follows: In a two-thousand (2000) milliliter beaker surrounded by a water bath I prepare five hundred (500) grams of a two-percent (2.0%) solution (here the word solution is used in a non-technical sense) of soy bean protein at fifty degrees centigrade (50° C.), by dissolving, dispersing, or peptizing ten (10) grams of neutral soy bean protein in water, or by re-dissolving, re-dispersing, or re-peptizing freshly extracted and washed wet soy bean curd, or by any other means which achieves the same result. The neutral soy bean protein solution, or sol, is held at fifty degrees centigrade (50° C.), and used as a starting material, or foundation, for the preparation. To this solution, or sol, I add consecutively, while the mixture is stirred, fifty-five (55.0) grams of commercial glucose containing sixteen percent to eighteen percent (16.0%–18.0%) moisture, twelve and one-half (12.5) grams of monoglyceride obtained by reacting glycerin with hydrogenated soy bean oil, five (5.0) grams of sodium chloride, two and one-half (2.5) grams colloidal tricalcium phosphate, and two hundred ninety (290.0) grams of plain refined hydrogenated soy bean oil. I then make the mixture to one thousand (1000) grams with water of the same temperature and homogenize it with a piston-and-cylinder or other type homogenizer. After homogenization, the topping is essentially complete, but I can add artificial flavor and color, as well neutral and inert edible minerals and vitamins. I can also pasteurize it one-half hour at seventy degrees centigrade (70° C.) before bottling it.

Addition of common table salt (sodium chloride) and neutral flavoring, when used in the usual small proportions, as one percent to two percent (1.0%–2.0%), to improve the palatability of the product, appear to have no effect on the whipping characteristics.

Incorporation of desirable minerals, such as calcium and phosphorus, can be done in any manner whatsoever in which the minerals used do not precipitate the protein or otherwise break the emulsion. As an example, colloidal tricalcium phosphate can be added to furnish the elements mentioned above.

The ingredients named can be mixed in any consecutive order which is convenient. It is not necessary to premix any one ingredient with any other ingredient before adding either to the remainder of the ingredients.

Vitamins can be added to enhance the nutritive value of the topping.

I have found by experiment that with the use of the partial glycerides described herein, no additional emulsifier, stabilizer, or surface active agent is necessary. I have further found that the monoglyceride is more effective in promoting favorable whipping qualities than the diglyceride, when they are used in the same quantities, although either, or both, are effective.

In the foregoing description the word fat is used as equivalent to the word shortening, and either word is used to mean a substance which is solid or semi-solid, and will not pour, at room temperature.

My invention is a vegetable topping, which after whipping resembles whipped cream, and in which the fat component is ordinary refined hydrogenated vegetable oil, and also whose whipping characteristics are due to and controlled by the amount which the topping contains of a monoglyceride derived from glycerin and an edible fat of vegetable origin, such as hydrogenated soy bean oil, or of the diglyceride thus derived, or of a mixture of the monoglyceride and the diglyceride thus derived.

Its advantages are that its fat component is a common food substance neglected in the prior art, namely, plain refined vegetable fat, and also that its whipping characteristics are known in advance, that is to say, before the topping is whipped.

Having thus described my invention and how it is made, what I claim as new and desire to secure by Letters Patent is as follows:

1. A vegetable topping adapted to incorporate and hold a predetermined quantity of air when whipped and comprising in approximate percentages by weight from 0.8% to 1.5% of a vegetable protein, from 4.0% to 8.0% of vegetable carbohydrate, from 25.0% to 35.0% of a plain refined vegetable fat, from 0.8% to 3.0% of a stabilizer comprising the reaction product of the metathetical reaction of glycerin and an edible vegetable oil compatible with said refined vegetable fat, and water in sufficient amounts to provide the balance of 100%.

2. A vegetable topping comprising an emulsified mixture consisting, in approximate per cents by weight, 1.0% of vegetable protein, 4.8% of a vegetable carbohydrate, 1.0% of a monoglyceride resulting from the metathetical reaction of glycerin, and an edible vegetable oil compatible with said plain refined edible fat of vegetable origin, 0.50% of sodium chloride, 0.25% of colloidal tricalcium phosphate, and water sufficient to make 100%.

3. A vegetable topping comprising an emulsified mixture consisting of approximately 1.0% by weight of vegetable protein, approximately 4.8% by weight of vegetable carbohydrate, approximately 29% by weight of plain refined edible fat of vegetable origin, approximately 2.0% of a diglyceride derived from the metathetical reaction of glycerin and an edible fat of vegetable origin, compatible with said plain refined edible fat of vegetable origin, approximately .50% of sodium chloride, approximately 0.25% of colloidal tricalcium phosphate and water in amounts sufficient to make 100%.

4. A vegetable topping adapted to incorporate and hold a predetermined quantity of air when whipped and comprising, in approximate percentages by weight, from 0.8% to 1.5% of edible soy bean protein, 4.0% to 8.0% of a vegetable carbohydrate, 25.0% to 35.0% of hydrogenated soy bean oil, 0.8% to 3.0% of a partial glyceride produced by the reaction of glycerin and an edible fat of vegetable origin compatible with said hydrogenated soy bean oil and adapted to stabilize said topping while facilitating the whipping thereof, and water in an amount to provide the balance of 100% by weight.

5. A vegetable topping as claimed in claim 1 and further characterized in that the ingredients are mixed to form an emulsion predominantly of the oil in water type.

6. An emulsified topping formed of vegetable materials and comprising approximately 1.0% by weight of edible soy bean proteins, approximately 4.8% by weight of dextrose, approximately 29.0% by weight of hydrogenated soy bean oil, approximately 1.0% by weight of a monoglyceride derived from glycerin reacted with hydrogenated soy bean oil, approximately 0.50% by weight of sodium chloride, approximately 0.25% by weight of colloidal tricalcium phosphate and water in amounts sufficient to provide the balance of 100% by weight.

7. An emulsified topping formed of materials of vegetable origin and comprising approximately 1.0% by weight of edible soy bean proteins, approximately 4.8% by weight of dextrose, approximately 2.0% by weight of a di-glyceride produced by the reaction of glycerine and hydrogenated soy bean oil, approximately 29.0% by weight of hydrogenated soy bean oil, approximately 0.5% by weight of sodium chloride, approximately 0.25% by weight of colloidal tricalcium phosphate and water in sufficient amounts to provide the balance of 100% by weight.

8. A method of manufacturing a vegetable topping having predetermined whipping characteristics which consists in emulsifying approximately 0.8% to 1.5% by weight of edible soy bean protein, approximately 4% to 8% by weight of vegetable carbohydrate, approximately 25% to 35% by weight of hydrogenated soy bean oil, approximately 0.8% to 3% by weight of an emulsifying and stabilizing agent produced by the metathetical reaction of glycerine and an edible vegetable oil compatible with said hydrogenated soy bean oil, and water in an amount sufficient to constitute 100%, said mixture comprising an emulsion of fluid consistency and predominantly of the oil in water type whose volume may be increased on whipping by the incorporation and retention of air therein.

HOLTON W. DIAMOND.

REFERENCES CITED

The following references are of record in the file of this patent:

UNITED STATES PATENTS

| Number | Name | Date |
| --- | --- | --- |
| 1,831,728 | Working | Nov. 10, 1931 |
| 2,024,356 | Harris | Dec. 17, 1935 |
| 2,065,398 | Roth | Dec. 22, 1936 |
| 2,162,585 | Musher | June 13, 1939 |
| 2,203,643 | Musher | June 4, 1940 |

OTHER REFERENCES

"An Active Whipping Substance from Soybean Flour," Watts et al, Ind. and Eng. Chemistry, October 1939, pages 1282 and 1283.